United States Patent [19]
Nakatani

[11] Patent Number: 4,490,786
[45] Date of Patent: Dec. 25, 1984

[54] VECTOR PROCESSING UNIT
[75] Inventor: Shoji Nakatani, Kawasaki, Japan
[73] Assignee: Fujitsu Limited, Kawasaki, Japan
[21] Appl. No.: 388,196
[22] Filed: Jun. 14, 1982
[30] Foreign Application Priority Data
  Jun. 19, 1981 [JP] Japan .................. 56-95681
[51] Int. Cl.³ .............................................. G06F 1/00
[52] U.S. Cl. ...................... 364/200; 364/736
[58] Field of Search ............... 364/200 MS File, 736
[56] References Cited
U.S. PATENT DOCUMENTS
4,172,287 10/1979 Kawabe et al. ................ 364/200 X
4,302,818 11/1981 Niemann ........................ 364/200 X Primary Examiner—Raulfe B. Zache
Attorney, Agent, or Firm—Staas & Halsey

[57] ABSTRACT

A vector processing unit in which a plurality of successive vector elements of a vector can be read out from a vector register simultaneously in one machine cycle and a plurality of successive vector elements of a vector can be written into the vector register simultaneously in one machine cycle. The vector processing unit is capable of executing compression transformation and extension transformation of a vector efficiently with simplified hardware.

8 Claims, 12 Drawing Figures

| $m_0$ | $m_1$ | $m_2$ | $m_3$ | SHIFT CONTROL |
|---|---|---|---|---|
| 0 | 0 | 0 | 0 | NONE |
| 0 | 0 | 0 | 1 | $3 \to a_0$ |
| 0 | 0 | 1 | 0 | $2 \to a_0$ |
| 0 | 0 | 1 | 1 | $2 \to a_0$, $3 \to a_1$ |
| 0 | 1 | 0 | 0 | $1 \to a_0$ |
| 0 | 1 | 0 | 1 | $1 \to a_0$, $3 \to a_1$ |
| 0 | 1 | 1 | 0 | $1 \to a_0$, $2 \to a_1$ |
| 0 | 1 | 1 | 1 | $1 \to a_0$, $2 \to a_1$, $3 \to a_2$ |
| 1 | 0 | 0 | 0 | $0 \to a_0$ |
| 1 | 0 | 0 | 1 | $0 \to a_0$, $3 \to a_1$ |
| 1 | 0 | 1 | 0 | $0 \to a_0$, $2 \to a_1$ |
| 1 | 0 | 1 | 1 | $0 \to a_0$, $2 \to a_1$, $3 \to a_2$ |
| 1 | 1 | 0 | 0 | $0 \to a_0$, $1 \to a_1$ |
| 1 | 1 | 0 | 1 | $0 \to a_0$, $1 \to a_1$, $3 \to a_2$ |
| 1 | 1 | 1 | 0 | $0 \to a_0$, $1 \to a_1$, $2 \to a_2$ |
| 1 | 1 | 1 | 1 | $0 \to a_0$, $1 \to a_1$, $2 \to a_2$, $3 \to a_3$ |

VECTOR PROCESSING UNIT

BACKGROUND OF THE INVENTION

This invention relates to a vector processing unit in which a plurality of successive elements of a vector can be read out from a vector register simultaneously in one machine cycle and can be written into the vector register simultaneously in one machine cycle, said vector processing unit being capable of executing compression transformation and extension transformation of a vector efficiently with simplified hardware.

Generally, a vector processing unit has processing devices of various types, vector registers, and a controlling device and executes various kinds of vector commands. For example, a vector addition command has the following format: VAD, R1, R2, R3, M. In this format, a vector $A$ ($A = a_0, a_1 \ldots a_{n-1}$) designated by the second operand designation R2 and a vector $B$ ($B = b_0, b_1 \ldots b_{n-1}$) designated by the third operand designation R3 are added, respectively, in the corresponding elements, and the vector $C$ obtained by the addition is written into the vector register designated by the first operand designation R1. In the above-mentioned format, M denotes a mask register, and whether or not the operation is to be executed and whether or not writing into the vector register is to be executed is controlled in accordance with the data in the mask register.

In general, as vector commands, there are a vector addition command, a vector multiplication command, a vector subtraction command, a vector store command, a vector load command, and the like. Besides, there may be used a vector compression command and a vector extension command. These two vector commands are very useful when a vector to be processed has a large number of elements, most of which are null.

The vector compression command has the following format:

VCP   R1,   R3,   M and the vector extension command has the following format:

VEX   R1,   R3,   M

FIG. 1 illustrates compression transformation of a vector, in which M denotes a mask register, VR(3) denotes the vector register designated by the third operand designation R3, and VR(1) denotes the vector register designated by the first operand designation R1. In compression transformation, the row of elements in the vector register VR(3) and the row of mask elements in the register M are compared, a compressed row of elements in which the elements in the register VR(3) corresponding to the "0" mask elements are removed is formed, and this compressed row of elements is written into the vector register VR(3) beginning with the top element without disrupting the order of the compressed row of elements, as shown in FIG. 1.

FIG. 2 illustrates extension transformation of a vector. In extension transformation, the row of elements in the vector register VR(1) and the row of mask elements in the mask register are compared, and the row of elements in the vector register VR(3) are written into the storage regions of the elements of the vector register VR(1) corresponding to the "1" mask elements of the mask register M without disrupting the order of the extended row of elements, as shown in FIG. 2.

In a vector processing unit of the prior art, when the vector $A$ is read out from the vector register, each one of the elements $A_0, A_1, \ldots, A_n$ of the vector $A$ is read out from the vector register successively, and when the vector $C$ is written into the vector register, each one of the elements $C_0, C_1, \ldots C_n$ is written into the vector register successively. In the above-mentioned vector processing unit, compression transformation and extension transformation can be executed comparably readily.

However, recently, in order to process a large quantity of data at a high speed, another vector processing unit of the prior art in which a plurality of elements belonging to the same vector are supplied to the arithmetic circuit simultaneously and are written into the vector register simultaneously has been used. In this vector processing unit, compression transformation and extension transformation cannot be executed as readily as in the first mentioned vector processing unit of the prior art. Thus, in the second mentioned vector processing unit, there is the problem of how compression transformation and extension transformation of a vector can be more simply controlled using less hardware.

SUMMARY OF THE INVENTION

An object of the present invention is to provide a vector processing unit in which a plurality of elements belonging to the same vector can be simultaneously read out from a vector register and simultaneously written into the vector register, said vector processing unit being capable of executing compression transformation and extension transformation of a vector efficiently with simplified hardware.

In accordance with the present invention, there is provided a vector processing unit comprising: a vector register from which a plurality N of successive vector elements belonging to the same vector can be read out in one machine cycle and into which a plurality N of successive vector elements belonging to the same vector can be written in one machine cycle; a mask register from which a plurality of mask elements having the same element numbers as said N vector elements read out from said vector register are read out synchronously with the reading of the corresponding vector elements; N data buses for reading which are provided, respectively, for said N vector elements read out from said vector register; N data buses for writing which are provided, respectively, for said N vector elements written into said vector register; and an aligning circuit for connecting each of said N data buses for reading selectively to each of said N data buses for writing selectively. The vector processing unit also comprises N generators for generating N constants corresponding, respectively, to said N data buses for reading or for writing when compression transformation and/or extension transformation of the vector elements is executed in accordance with a predetermined value A of the mask elements read out from said mask register; N first ports $a_0$ through $a_{N-1}$; a first selector circuit for connecting each of said N constant generators to each of said N first ports $a_0$ through $a_{N-1}$ selectively; a first selecting-signal generating circuit for controlling said first selector circuit in accordance with said N mask elements read out simultaneously from said mask register; N second ports $b_0$ through $b_{N-1}$; a second selector circuit for connecting each of said N first ports $a_0$ through $a_{N-1}$ to each of said N second ports $b_0$ through $b_{N-1}$ selectively; an integrating circuit for integrating the number of mask elements having said predetermined

3 value A among the mask elements read out from said mask register; and means for controlling said second selector circuit in accordance with the integrated value in said integrating circuit; and the output signals from said second ports $b_0$ through $b_{N-1}$ are used as gate-controlling signals for said aligning circuit.

DESCRIPTION OF THE PREFERRED EMBODIMENT

A vector processing unit in accordance with one embodiment of the present invention will be described with reference to the accompanying drawings.

Figure 1:
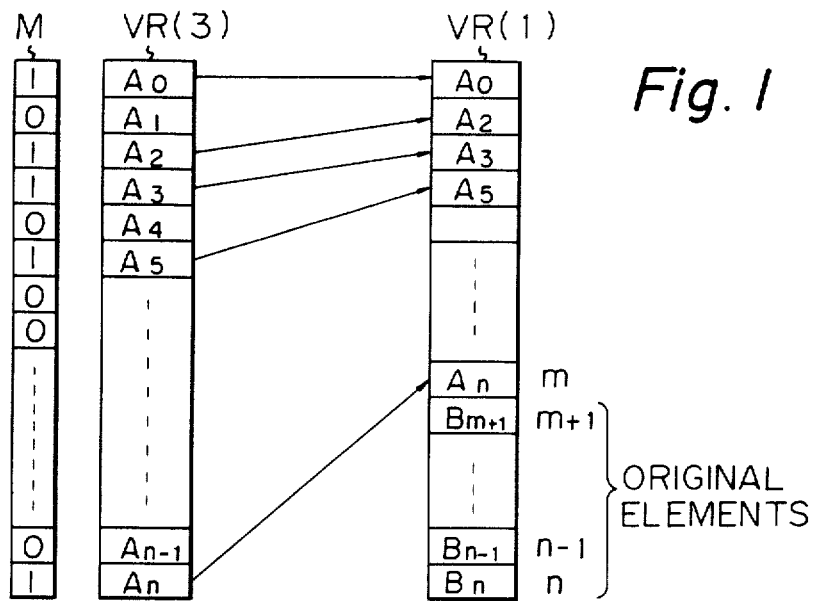
FIG. 1 is a schematic diagram explaining compression transformation of a vector.
Figure 2:
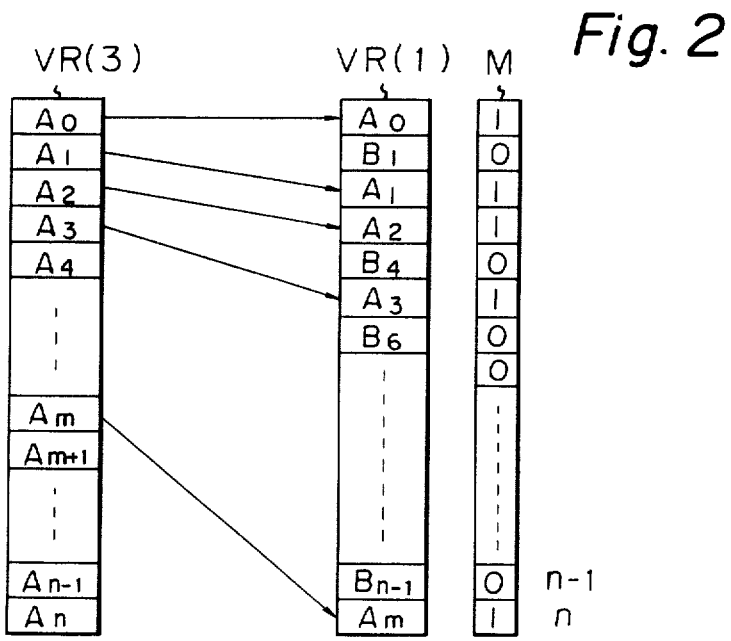
FIG. 2 is a schematic diagram explaining extension transformation of a vector.
Figure 3:
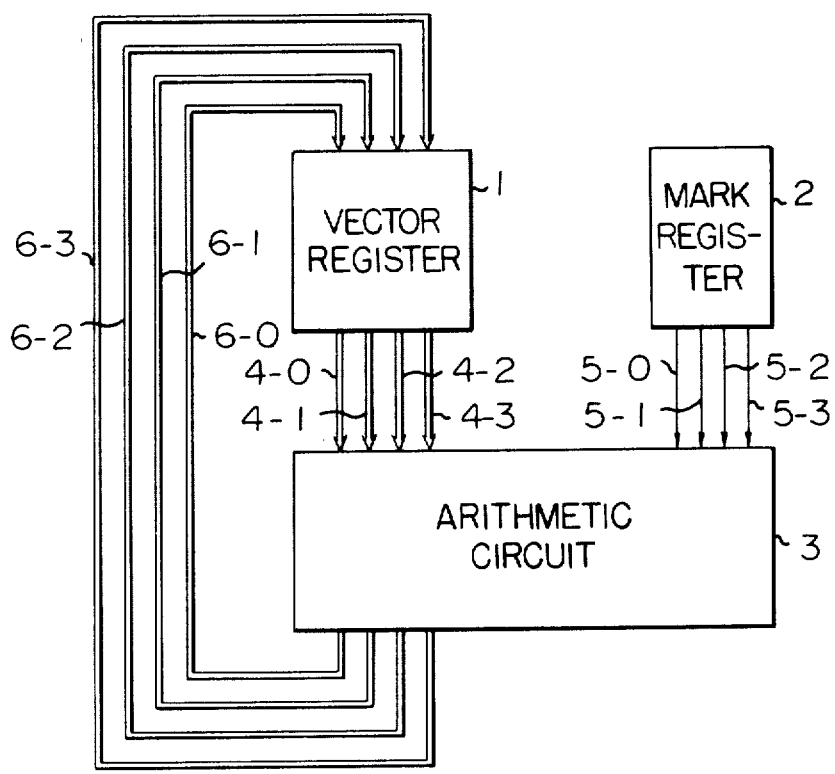
FIG. 3 is a schematic block diagram of a vector processing unit to which the present invention is applied.

FIG. 3 illustrates a schematic diagram of a vector processing unit to which the present invention is applied. In FIG. 3, 1 denotes a vector register, 2 denotes a mask register, 3 denotes an arithmetic circuit, 4-0 through 4-3 denote data buses for reading, 5-0 through 5-3 denote data buses for mask elements, and 6-0 through 6-3 denote data buses for writing, respectively. In the vector processing unit of FIG. 3, when a vector, for example $A\backslash$, is read out from the vector register 1 and is supplied to the arithmetic circuit 3, at the 0-th cycle, which is assumed to be started at a certain time $T_m$, the vector elements $A_0$, $A_1$, $A_2$ and $A_3$ are read out simultaneously and then at the 1-st cycle the vector elements $A_4$, $A_5$, $A_6$ and $A_7$ are read out simultaneously. Similarly, at the i-th cycle the vector elements $A_{4i}$, $A_{4i+1}$, $A_{4i+2}$ and $A_{4i+3}$ are read out simultaneously.

In the case of reading out the mask vector M from the mask register 2 and supplying it to the arithmetic circuit 3, as described above, at the i-th cycle, the four mask elements $M_{4i}$, $M_{4i+1}$, $M_{4i+2}$ and $M_{4i+3}$, are read out simultaneously. When writing the resultant vector C being output from the arithmetic circuit 3 into the vector register 1, the vector elements $C_0$, $C_1$, $C_2$ and $C_3$ are written simultaneously at the 0-th cycle, which is assumed to be started at a certain time $T_n$, the vector elements $C_4$, $C_5$, $C_6$ and $C_7$ are written simultaneously at the 1-st cycle, and the vector elements $C_{4i}$, $C_{4i+1}$, $C_{4i+2}$ and $C_{4i+3}$ are written simultaneously at the i-th cycle. The vector register 1 comprises four memory devices, each of which has eight banks being able to read and to write individually, and the starting time of reading out a vector from the vector register 1 and the

4 starting time of writing a vector into the vector register 1 are predetermined, respectively, in accordance with the kind of vector command.

Figure 4:
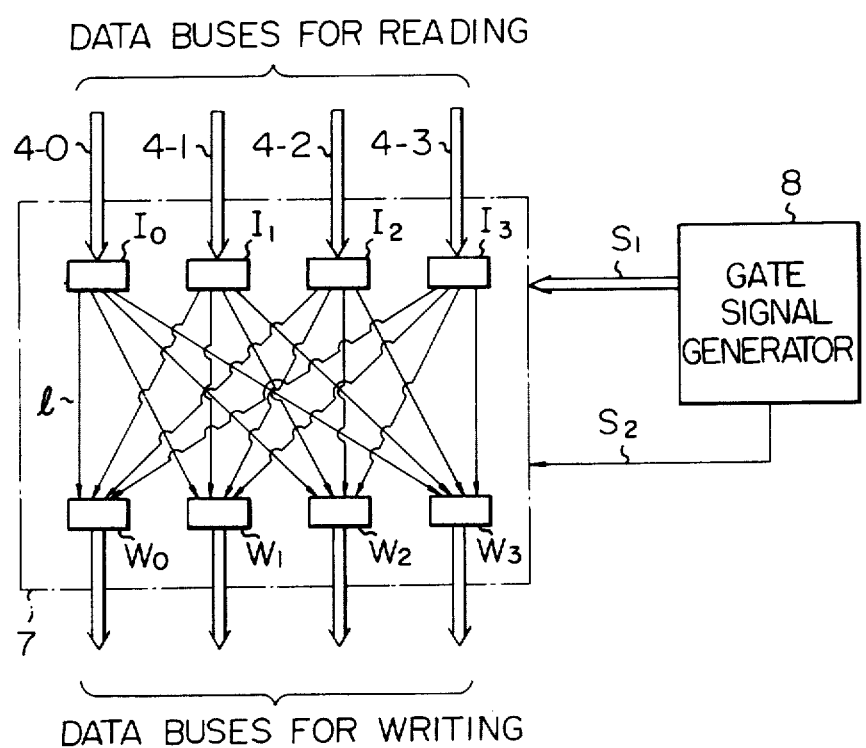
FIG. 4 is a schematic circuit diagram of a principal portion of a vector processing unit in accordance with one embodiment of the present invention.

FIG. 4 illustrates a schematic circuit diagram of a principal portion of the vector processing unit of FIG. 3. In FIG. 4, an aligning circuit 7, and a gate-signal generator circuit 8 are illustrated. The aligning circuit 7 comprises input ports $I_0$ through $I_3$, output ports $W_0$ through $W_3$, a plurality of signal lines 1, and gate circuits provided on the signal lines 1 (not shown). The input terminals of the input ports $I_0$ through $I_3$ are connected to the data buses for reading 4-0 through 4-3, respectively. Each of the input ports $I_0$ through $I_3$ is also connected to all of the output ports $W_0$ through $W_3$ through the signal lines 1. The output terminals of the output ports $W_0$ through $W_3$ are connected to the data buses for writing 6-0 through 6-3, respectively.

Figure 5:
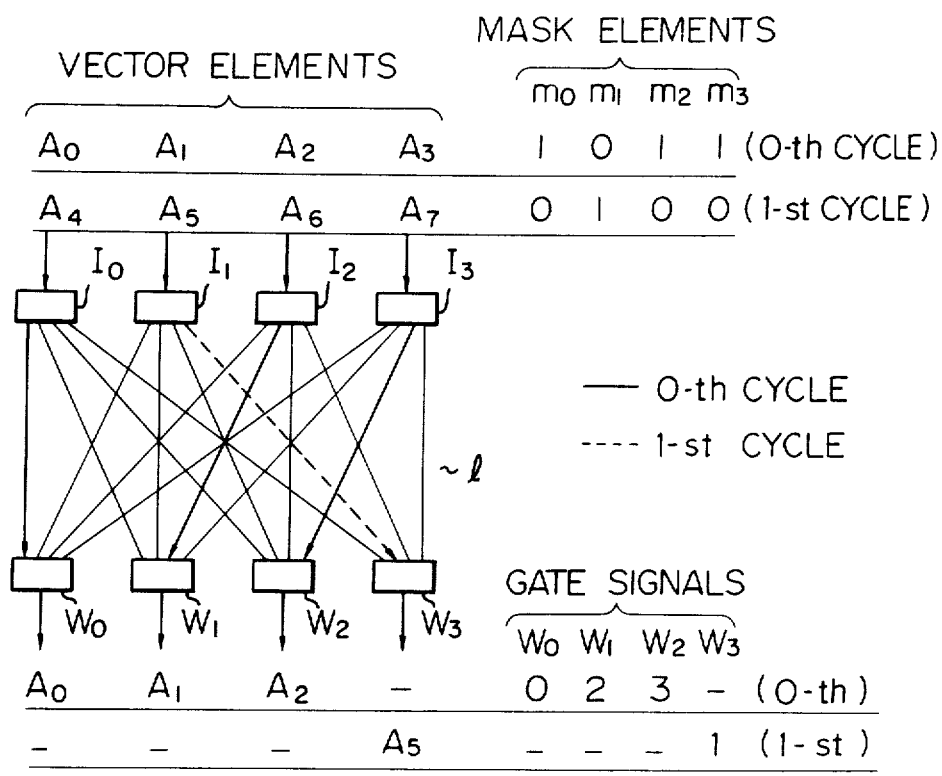
FIG. 5 is a schematic diagram explaining compression transformation according to the vector processing unit of FIG. 4.

In FIG. 5, the manner in which compression transformation of the vector $A\backslash$ is executed in accordance with the vector processing unit of FIG. 4 is illustrated. It is assumed that the mask elements read out from the mask register 2 at the 0-th cycle are "1011" and that the mask elements read out from the mask register 2 at the 1-st cycle are "0100". In this case, the gate control signals $S_1$ at the 0-th cycle are a "0" gate signal supplied to the output port $W_0$, a "2" gate signal supplied to the port $W_1$, a "3" gate signal supplied to the port $W_2$, and a "no" gate signal supplied to the port $W_3$. When the output port $W_i$ (i=0, 1, 2, 3) is supplied with the "j" gate signal (j=0, 1, 2, 3), the gate provided on the signal line from the input port $I_j$ among the four signal lines 1 connected to the output port $W_i$ is opened. The gate control signals $S_1$ at the 1-st cycle are "no" gate signals supplied to the output ports $W_0$, $W_1$ and $W_2$ and a "1" gate signal supplied to the port $W_3$. Accordingly, at the 0-th cycle the vector elements $A_0$, $A_1$ and $A_2$ of the vector $A\backslash$ are sent out on the data buses for writing 6-0, 6-1 and 6-2, respectively, and at the 1-st cycle the vector element $A_5$ of the vector $A\backslash$ is sent out on the data bus for writing 6-3. These four elements $A_0$, $A_2$, $A_3$ and $A_5$ are written into the vector register 1 as the elements of the compressed vector.

The above-mentioned operation is repeated until all the elements of the vector $A\backslash$ are read out and the compressed vector is obtained.

Figure 6:
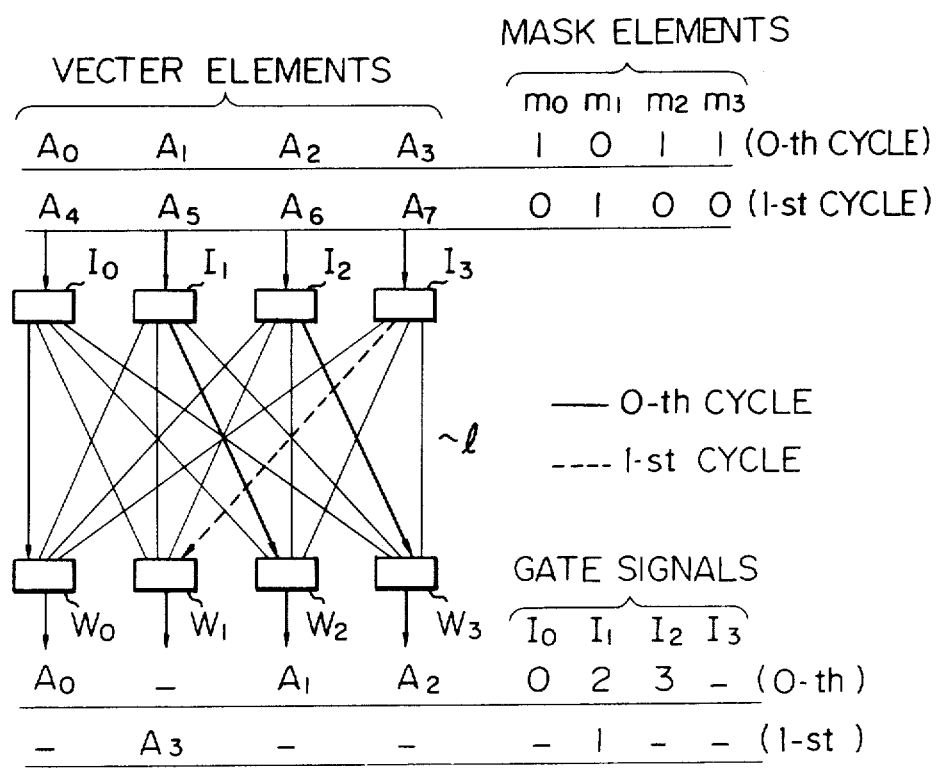
FIG. 6 is a schematic diagram explaining extension transformation according to the vector processing unit of FIG. 4.

In FIG. 6, the manner in which extension transformation of a vector $A\backslash$ is executed in accordance with the vector processing unit of FIG. 4 is shown. It is assumed that the row of mask elements is the same as that of FIG. 5. In this case, the gate control signals $S_1$ at the 0-th cycle are a "0" gate signal supplied to the input port $I_1$, a "2" gate signal supplied to the input gate $I_0$, a "3" gate signal supplied to the input gate $I_2$, and a "no" gate signal supplied to the input gate $I_3$. When the input gate $I_i$ (i=0, 1, 2, 3) is supplied with the "j" gate signal (j=0, 1, 2, 3), the gate provided on the signal line connected to the j-th output port $W_j$ among the four signal lines originating from the input port $I_i$ is opened. The gate control signals $S_1$ at the 1-st cycle are "no" gate signals supplied to the input ports $I_0$, $I_1$ and $I_2$ and a "1" gate signal supplied to the input port $I_3$. Accordingly, at the 0-th cycle, the vector element $A_0$ is sent out on the data bus for writing 6-0, the vector element $A_1$ is sent out on the data bus for writing 6-2, and the vector element $A_2$ is sent out on the data bus for writing 6-3. Then, at the 1-st cycle, the vector element $A_3$ is sent out on the data bus for writing 6-1. Thus, at the 0-th cycle, the vector elements $A_0$, $A_1$ and $A_2$ are written into the vector register 1 as the elements of the extended vector, and at the 1-st cycle the vector element $A_3$ is written into the vector register 1 as the element of the extended vector. The above-mentioned operation is repeated until the extended vector is obtained in the vector register 1.

Figure 7:
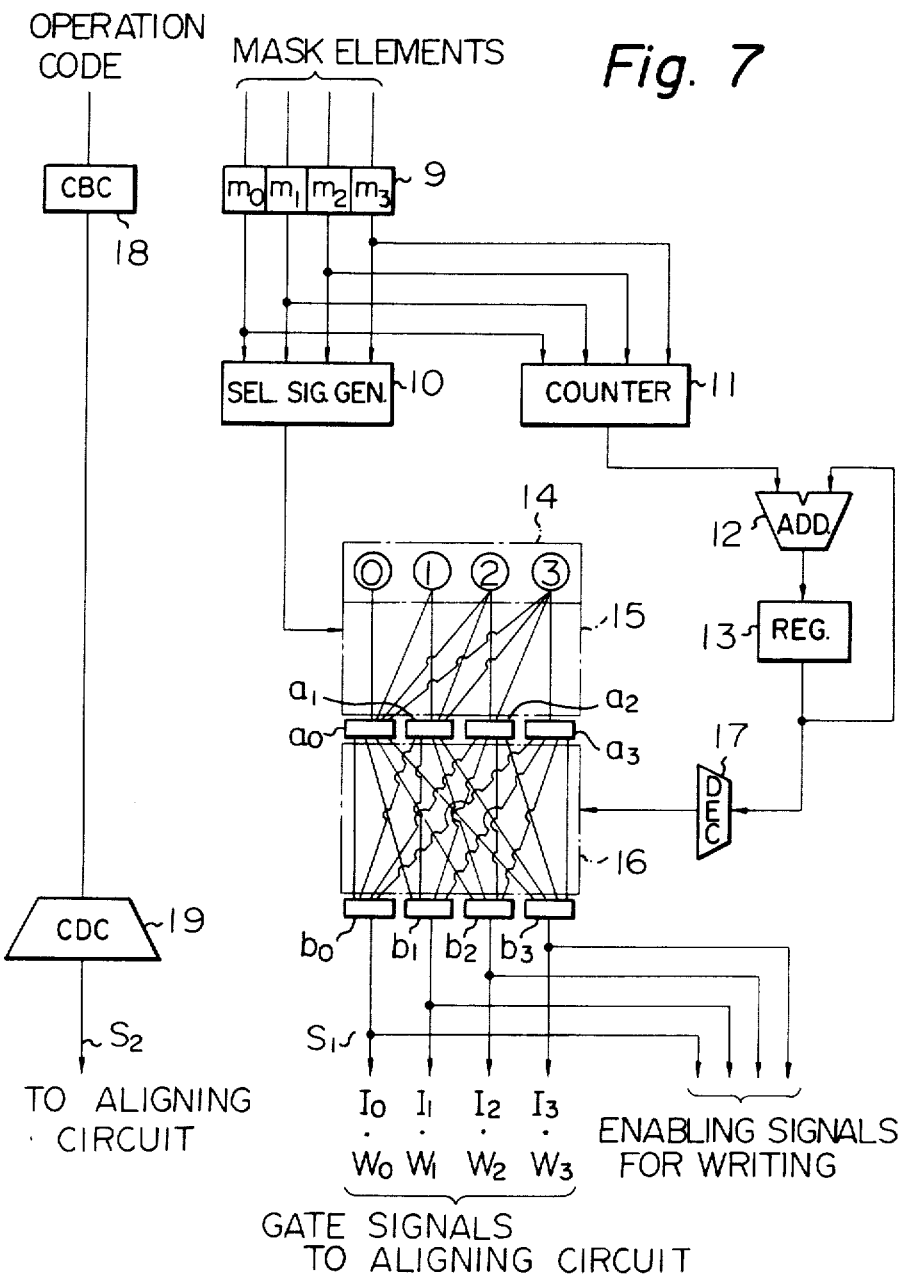
FIG. 7 is a detailed circuit diagram of the vector processing unit of FIG. 4.

FIG. 7 illustrates a block diagram of the gate-signal generator circuit 8 of FIG. 4. In FIG. 7, 9 denotes a mask buffer register, 10 denotes a first-selecting-signal generating circuit, 11 denotes a counter circuit for counting the number of "1" elements in the mask buffer register 9, 12 denotes an adder circuit, 13 denotes an integration register, 14 denotes a constant generating circuit, 15 denotes a first selector circuit, 16 denotes a second selector circuit, 17 denotes a decoder circuit as means for controlling the second selector circuit, 18 denotes a command buffer circuit, 19 denotes a command decoder circuit, $a_0$ through $a_3$ denote first ports, and $b_0$ through $b_3$ denote second ports, respectively.

The operation code of the vector command is set into the command buffer circuit 18 and is supplied to the command decoder circuit 19, and the vector command is decoded by the command decoder circuit 19. When the operation code commands compression transformation or extension transformation, a "1" or "0" signal $S_2$ is transmitted from the command decoder circuit 19 to the aligning circuit 7.

The successive four mask elements read out from the mask register 1 simultaneously are set into the mask buffer register 9. The first-selecting-signal generating circuit 10 generates a control signal for controlling the first selector circuit 15 in accordance with the contents of the mask buffer register 9. The counter circuit for counting the number of "1" elements 11 counts the number of "1" elements in the mask buffer register 9, and the number of "1" elements is transmitted from the counter circuit 11 to the adder circuit 12. The adder circuit 12 adds the number of "1" elements transmitted from the counter circuit 11 and the content of the integration register 13 and writes the resultant value into the integration register 13. The constant generating circuit 14 has a portion for generating a constant "0", a portion for generating a constant "1", a portion for generating a constant "2", and a portion for generating a constant "3". Each of these constants is represented by three bits, in which the first bit is the effective flag and the remaining two bits indicate the constants "0", "1", "2" and "3".

Figure 8:
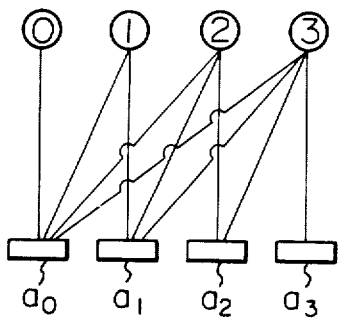
FIG. 8 is a schematic diagram explaining the operation of the first selector circuit of FIG. 7.

FIG. 8 illustrates the operation of the first selector circuit 15. The first port $a_0$ is connected through the signal lines to the portions for generating the constants "0", "1", "2" and "3", the first port $a_1$ is connected through the signal lines to the portions for generating the constants "1", "2" and "3", the first port $a_2$ is connected through the signal lines to the portions for generating the constants "2" and "3", and the first port $a_3$ is connected through the signal lines to the portion for generating the constant "3". A gate is provided on each of the signal lines. For example, when the mask elements $m_0$, $m_1$, $m_2$ and $m_3$ are "0000", no signal is output from the first ports $a_0$, $a_1$, $a_2$ and $a_3$. When the mask elements $m_0$, $m_1$, $m_2$ and $m_3$ are "0001", the data supplied from the portion for generating the constant "3" is output from the first port $a_0$. As described previously, the data supplied from the portion for generating the constant "3" is represented by "111", in which the first bit is the effective flag.

Figure 9A:
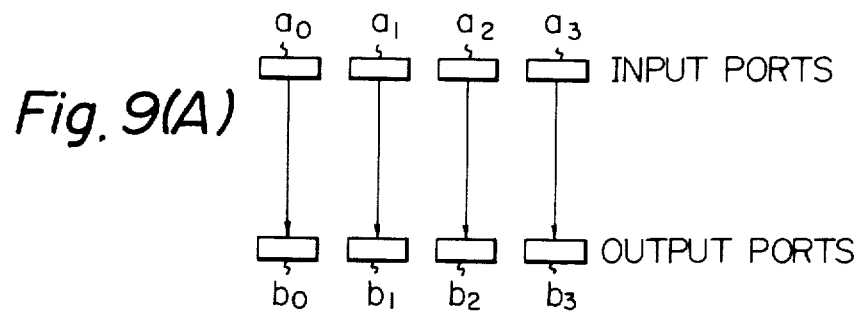
FIGS. 9(A)-9(D) are a schematic diagrams explaining the operation of the second selector circuit of FIG. 7.
Figure 9B:
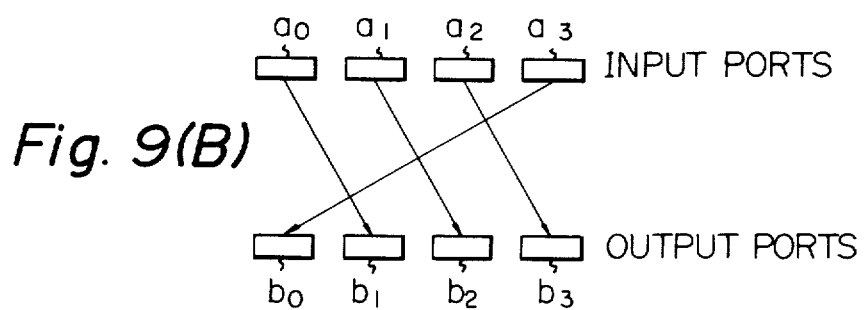
Figure 9C:
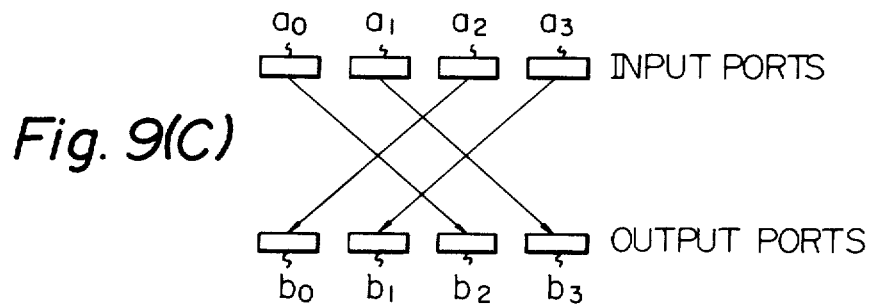
Figure 9D:
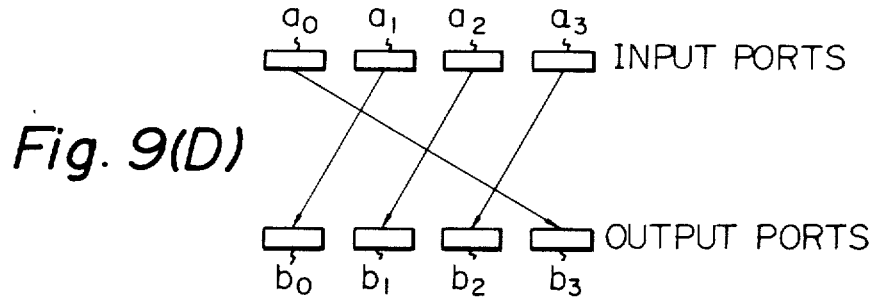

As shown in FIG. 7, in the second selector circuit 16, the first port $a_0$ is connected through the signal lines to the second ports $b_0$, $b_1$, $b_2$ and $b_3$, and the first port $a_1$ is connected through the signal lines to the second ports $b_0$, $b_1$, $b_2$ and $b_3$, as are the first ports $a_2$ and $a_3$. The second selector circuit 16 is controlled by the output as the decoder circuit 17 of the means for controlling the second selector circuit. FIGS. 9(A), (B), (C) and (D) illustrate the operation of the second selector circuit 16. FIG. 9(A) illustrates the connection between the first ports $a_0$ through $a_3$ and the second ports $b_0$ through $b_3$ when the contents of the integration register 13 is "0"; FIG. 9(B) illustrates the connection when the content is "1"; FIG. 9(C) illustrates the connection when the content is "2"; and FIG. 9(D) illustrates the connection when the content is "3". In FIG. 9(A), the first port $a_0$ is connected to the second port $b_0$, the first port $a_1$ is connected to the second port $b_1$, the first port $a_2$ is connected to the second port $b_2$, and the first port $a_3$ is connected to the second port $b_3$. The connections in FIGS. 9(B) through (D) can be easily understood and therefore are not described.

Now, the operation of the circuit of FIG. 7 is described with reference to the compression transformation shown in FIG. 5, for example. At the 0-th cycle, the data "1011" is set into the mask buffer register 9. Thus, since the contents of the mask buffer register 9 is "1011", the first port $a_0$ outputs the constant "0", the first port $a_1$ outputs the constant "2", the first port $a_2$ outputs the constant "3", and the first port $a_3$ outputs a "no" signal, as shown in FIG. 8. Since the content of the integration register 13 is "0" at the 0-th cycle, the connection between the first ports $a_0$ through $a_3$ and the second ports $b_0$ through $b_3$ is selected as shown in FIG. 9A. Further, since the output signal $S_2$ of the decoder circuit 19 is "1", the "0" gate signal is supplied to the output port $W_0$, the "2" gate signal is supplied to the output port $W_1$, the "3" gate signal is supplied to the output port $W_2$, and a "no" gate signal is supplied to the output port $W_3$. Thus, since the enabling signals for writing into the vector register 1 are set as "1110", the vector elements sent out on the data buses for writing 6-0, 6-1, and 6-2 are written into the vector register 1 while the vector element sent out on the data bus for writing 6-3 is not written into the vector register 1.

At the 1-st cycle, since the contents of the mask buffer register 9 is "0100", the first port $a_0$ outputs the constant "1", and the other first ports do not output any signal. Since the content of the integration register 13 is "3" at the 1-st cycle, the connection between the first ports $a_0$ through $a_3$ and the second ports $b_0$ through $b_3$ is set as shown in FIG. 9D. Accordingly, the second ports $b_0$ through $b_2$ do not output any signal, the second port $b_3$ outputs the constant "1", and the enabling signals for writing into the vector register 1 are set as "0001". Thus, when the second port $b_3$ outputs the constant "1", the vector element on the data bus for reading 4-1 is sent out on the data bus for writing 6-3 and then is written into the vector register 1.

In the case of executing extension transformation, the circuit of FIG. 7 operates the same as in the case of compression transformation described above except that the signal $S_2$ from the decoder circuit 19 is "0" and the output signals of the second ports $b_0$ through $b_3$ are supplied to the input ports $I_0$ through $I_3$.

According to the present invention, there can be provided a vector processing unit which has the following advantages:

1. Compression transformation and extension transformation can be executed by using the same hardware.

2. The gate control signals for the aligning circuit can be produced easily, and writing into the vector register can be controlled by the enabling signals for writing which are produced from the effective flag of the gate control signals, thereby eliminating the need for an extra circuit.

3. Compression transformation and extension transformation of a vector can be executed without increasing the amount of hardware and without decreasing the processing speed.

I claim:

1. A vector processing unit, comprising:
   a vector register from which a plurality N of successive vector elements belonging to the same vector can be read out in one machine cycle and into which a plurality N of the successive vector elements belonging to the same vector can be written in one machine cycle, where N is an integer greater than or equal to 1;
   a mask register from which a plurality of mask elements having the same element numbers as said N vector elements read out from said vector register are read out synchronously with the reading of the corresponding vector elements;
   N read data buses, operatively connected to said vector register, for reading which are provided, respectively, for said N vector elements read out from said vector register;
   N write data buses, operatively connected to said vector register, for writing which are provided, respectively, for said N vector elements written into said vector register;
   an aligning circuit, operatively connected to said N read data buses and said N write data buses, for connecting each of said N read data buses selectively to each of said N write data buses selectively;
   N constant generators for generating N constants corresponding, respectively, to said N read and write data buses when compression transformation and/or extension transformation of the vector elements is executed in accordance with a predetermined value A of the mask elements read out from said mask register, where A is an integer greater than or equal to zero;
   N first ports $a_0$ through $a_{N-1}$;
   a first selector circuit, operatively connected between said N first ports and said N constant generators, for selectively connecting each of said N constant generators to each of said N first ports $a_0$ through $a_{N-1}$;
   a first-selecting-signal generating circuit, operatively connected between said mask register and said first selector circuit, for controlling said first selector circuit in accordance with said N mask elements read out simultaneously from said mask register;
   N second ports $b_0$ through $b_{N-1}$ producing output signals;
   a second selector circuit, operatively connected between said N first ports and said N second ports, for selectively connecting each of said N first ports $a_0$ through $a_{N-1}$ to each of said N second ports $b_0$ through $b_{N-1}$;
   an integrating circuit, operatively connected to said mask register, for integrating the number of mask elements having said predetermined value A among the mask elements read out from said mask register; and
   means, operatively connected between said integrating circuit and said second selector circuit, for controlling said second selector circuit in accordance with the integrated number in said integrating circuit, the output signals from said N second ports $b_0$ through $b_{N-1}$ are used as gate-controlling signals for said aligning circuit.

2. A vector processing unit as defined in claim 1, wherein said integrating circuit for integrating the number of mask elements having said predetermined value A among the mask elements read out from said mask register includes an m bits register, operatively connected to said mask register and said means for controlling, said m bits being large enough in number to select one port from said N first ports $a_0$ through $a_{N-1}$, that is $2^m \geq N$.

3. A vector processing unit as defined in claim 1, wherein when compression transformation or extension transformation of said vector elements is executed, the output signals of said second ports $b_0$ through $b_{N-1}$ are determined by the same logic regardless of compression transformation or extension transformation, said output signals of said second ports being attached to the signal designating whether compression transformation or extension transformation is to be executed and being used as the gate-controlling signals for said aligning circuit.

4. A vector processing unit as defined in claim 1, wherein the output signals of said second ports $b_0$ through $b_{N-1}$ being used not only as the gate-controlling signals for said aligning circuit but also as enabling signals for writing the vector elements into said vector register.

5. A vector processing unit as defined in claim 1, wherein the connection between said first ports $a_0$ through $a_{N-1}$ and said second ports $b_0$ through $b_{N-1}$ is shifted cyclically according to the integrated number in said integrating circuit.

6. A vector processing unit, comprising:
   a vector register;
   a mask register;
   gate control means, operatively connected to said mask register, for generating gate control signals in dependence upon the contents of said mask register; and
   aligning means, operatively connected to said vector register and said gate control means, for performing vector extension and compression transformations on the contents of said vector register in dependence the gate control signals.

7. A vector processing unit as defined in claim 6, wherein said gate control means comprises:
   a selection signal generating circuit, operatively connected to said mask register, for generating selection signals independence upon the contents of said mask register;
   a counter, operatively connected to said mask register for counting the contents of said mask register;
   an adder operatively connected to said counter;
   an integration register operatively connected to said said adder;
   a decoder, operatively connected to said integration register, for generating a decoder signal in dependence upon the contents of said integration register; and control signal generation means, operatively connected to said selection signal generation circuit and said decoder, for generating the gate control signals independence upon the selection signals and the decoder signal.

8. A vector processing unit as defined in claim 7, wherein said control signal generation means comprises:

a constant generating circuit for generating constants;

a first selection circuit, operatively connected to said constant generating circuit and said selection signal generating circuit, for selecting the constants in dependence upon the selection signals;

first ports, operatively connected to said first selection circuit, for storing the selected constants;

a second selection circuit, operatively connected to said first ports and said decoder, for selecting the contents of said first ports in dependence upon the decoder signal; and second ports, operatively connected to said second selection circuit and said aligning means, for storing and passing therethrough the selected contents as the gate control signals.

* * * * *

UNITED STATES PATENT AND TRADEMARK OFFICE
CERTIFICATE OF CORRECTION

PATENT NO. : 4,490,786

DATED : DECEMBER 25, 1984

INVENTOR(S) : SHOJI NAKATANI

It is certified that error appears in the above-identified patent and that said Letters Patent is hereby corrected as shown below:

Col. 3, line 28, delete "a".

Col. 4, line 9, "1" should be --$\ell$--;
line 10, "1" should be --$\ell$--;
line 31, "1" should be --$\ell$--.

Col. 6, line 6, "as" should be --of--;
line 7, "of" should be --as--.

Col. 8, line 53, after "pendence" insert --upon--;
line 58, "independence' should be --in dependence--;
line 63, delete "said".

Col. 9, line 4, "independence" should be --in dependence--.

Signed and Sealed this

Fifteenth Day of October 1985

[SEAL]

Attest:

DONALD J. QUIGG

Attesting Officer

Commissioner of Patents and
Trademarks—Designate